Aug. 19, 1947.   J. C. HAMILTON   2,425,799
WEINER ROASTING CLAMP
Filed Sept. 18, 1945
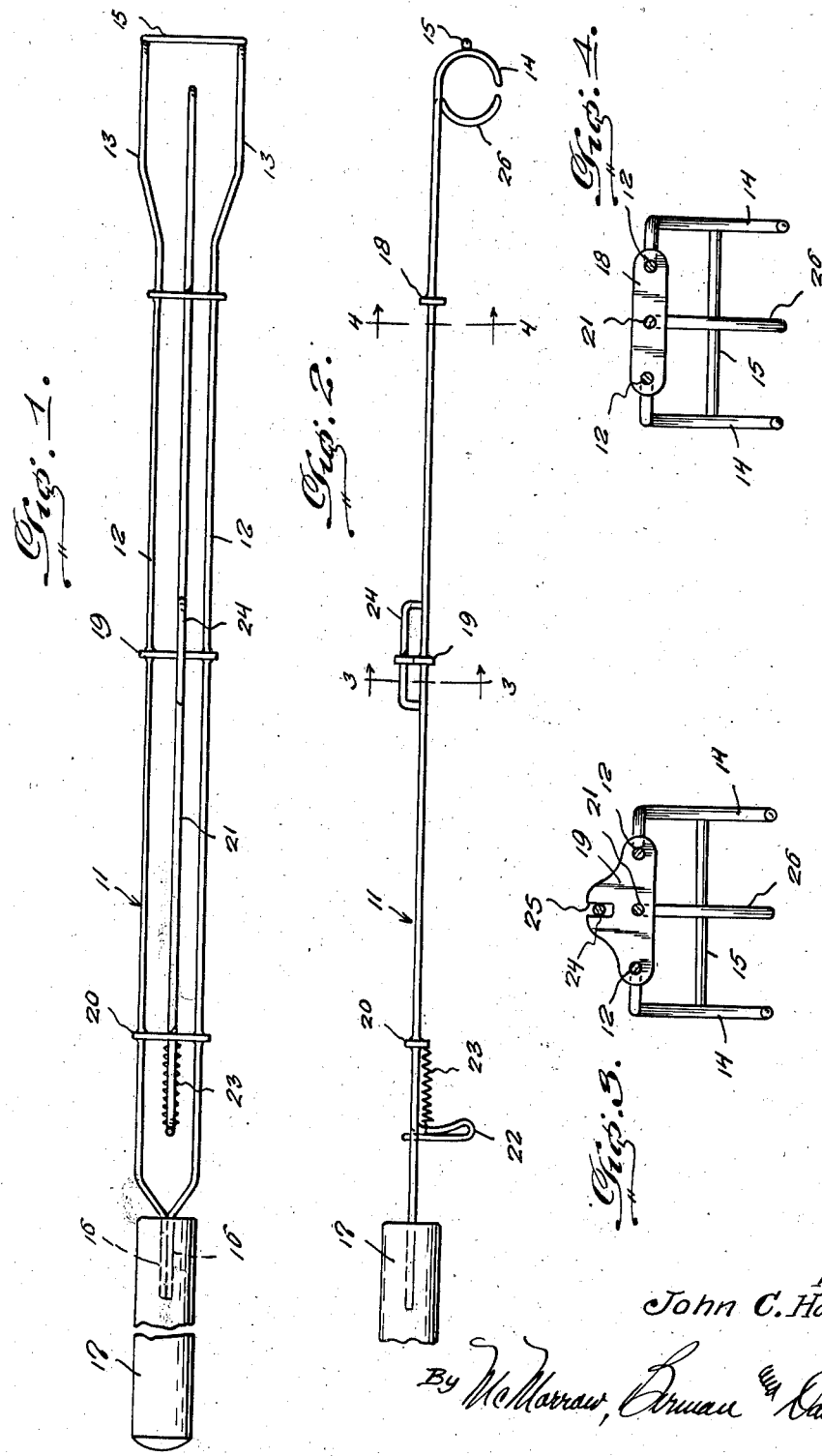
Inventor
John C. Hamilton,
By McMorrow, Berman & Davidson
Attorneys Patented Aug. 19, 1947

2,425,799

UNITED STATES PATENT OFFICE 2,425,799

WIENER ROASTING CLAMP

John C. Hamilton, Merced, Calif.

Application September 18, 1945, Serial No. 616,995

1 Claim. (Cl. 99—441)

This invention relates to tong devices and more particularly to a holding device for roasting wieners and the like before an open fire.

A main object of the invention is to provide a novel and improved wiener roasting clamp device wherein the wiener or similar object to be roasted is held without piercing the skin thereof so that all juices are retained.

A further object of the invention is to provide an improved wiener roasting clamp device of very simple construction wherein a wiener or other similar object to be roasted may be picked up and released without manual contact with the object and wherein the object is firmly held during the roasting process without piercing the skin thereof.

Further objects and advantages of the invention will appear from the following description and claim, and from the accompanying drawings, wherein—

Figure 1 is a plan view of a wiener roasting clamp device in accordance with this invention.

Figure 2 is a side elevational view of the clamp device of Figure 1.

Figure 3 is a cross-sectional view taken on line 3—3 of Figure 2.

Figure 4 is a cross-sectional view taken on line 4—4 of Figure 2.

Referring to the drawings, the clamp device comprises a body portion 11 consisting of a pair of elongated parallel rod members 12, 12 formed with outwardly offset forward end portions 13, 13 curved downwardly to form rearwardly facing substantially semi-circular hook elements 14, 14. Hook elements 14, 14 are rigidly connected together by a transverse bar member 15. The rearward end portions 16, 16 of rod members 12, 12 are inwardly offset and are rigidly joined, as by welding, and are securely fastened to a handle member 17 of wood or other suitable material.

Secured between rod members 12, 12 are a front transverse guide bar 18, an intermediate transverse guide bar 19 and a rear transverse guide bar 20, said guide bars being formed with aligned openings in the plane of rod members 12, 12 adapted to slidably receive an elongated tong rod 21 between the rod members 12, 12 and parallel thereto. The rear end of tong rod 21 is formed with a depending finger-engaging loop 22, and is resiliently secured to rear transverse guide bar 20 by a spring 23, which biases tong rod 21 to a forward position. The intermediate portion of tong rod 21 carries an inverted U-shaped guide member 24 which slidably engages in a vertical slot 25 formed in intermediate transverse bar 19. The forward end of tong rod 21 is formed with a depending forwardly facing semi-circular portion 26 cooperating with the adjacent rearwardly facing hook portions 14, 14 to firmly grip a wiener or similar object under the pressure of spring 23.

To separate the semi-circular jaw portions 14, 14 and 26, the operator pulls back on finger loop 22. A wiener or similar object may then be positioned between the jaw portions and the finger loop is then released. The curved jaw portions engage the wiener with firm gripping action but without piercing the skin. The wiener juices are thereby retained during the roasting process. After roasting, the wiener may be released by merely pulling back on finger loop 22. It is not necessary to handle the wiener directly either during the positioning of the wiener between the jaw portions preparatory to roasting or during the release thereof from said jaw portions after roasting.

While a specific embodiment of a wiener roasting clamp has been disclosed in the foregoing description, it will be understood that various modifications within the spirit of the invention may occur to those skilled in the art. Therefore it is intended that no limitation be placed on the invention other than as defined by the scope of the appended claim.

What is claimed is:

In roasting tongs, the combination, which comprises an elongated longitudinally extending frame having spaced parallel side bars with outwardly extended parallel sections at the ends and with the extreme ends having substantially semi-circular downwardly extending prongs connected with a transversely positioned cross-bar, an intermediate longitudinally extending bar positioned between said side bars parallel with and in the same plane as that of said side bars with the extreme end having a substantially semi-circular downwardly extending tong, transversely disposed vertically positioned bearing plates rigidly mounted at the ends thereof on said side bars spaced from the ends of said side bars and having centrally positioned openings in which said intermediate bar is slidably mounted, an intermediate transversely disposed vertically positioned bearing plate having a centrally disposed slot in the upper edge rigidly mounted at the ends thereof on said side bars, a yoke on said intermediate bar having a rectangularly-shaped section parallel to the bar slidable in said slot, a trigger extending downward from the inner end of said intermediate bar, a spring on said intermediate bar urging said bar outward with the prong at the outer end in gripping relation with the prongs of the side bars, and a handle in which the inner ends of said side bars are rigidly mounted.

JOHN C. HAMILTON.

REFERENCES CITED

The following references are of record in the file of this patent:

UNITED STATES PATENTS

| Number | Name | Date |
|---|---|---|
| 2,066,185 | Miller et al. | Dec. 29, 1936 |
| 2,102,818 | Rhew | Dec. 21, 1937 |
| 106,654 | Brown | Aug. 23, 1870 |
| 587,470 | Bible | Aug. 3, 1897 |

FOREIGN PATENTS

| Number | Country | Date |
|---|---|---|
| 1,926 | Great Britain | 1900 |